(12) United States Patent
Heo et al.

(10) Patent No.: US 11,110,964 B2
(45) Date of Patent: Sep. 7, 2021

(54) FRONT STRUCTURE OF VEHICLE BODY

(71) Applicants: Hyundai Motor Company, Seoul (KR); Kia Motors Corporation, Seoul (KR)

(72) Inventors: Chul Hee Heo, Gyeonggi-do (KR); Hyun Cheol Yun, Seoul (KR); Sun Hyung Cho, Gyeonggi-do (KR); Chan Gu Kang, Gyeonggi-do (KR); Jin Young Mo, Daejeon (KR); Dong Ho Kang, Gyeonggi-do (KR); Ji Ae Yong, Gangwon-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 140 days.

(21) Appl. No.: 16/543,862

(22) Filed: Aug. 19, 2019

(65) Prior Publication Data

US 2020/0324826 A1 Oct. 15, 2020

(30) Foreign Application Priority Data

Apr. 11, 2019 (KR) .......................... 10-2019-0042692

(51) Int. Cl.
*B62D 25/08* (2006.01)
*B62D 21/11* (2006.01)
(Continued)

(52) U.S. Cl.
CPC .......... *B62D 25/081* (2013.01); *B60S 1/0438* (2013.01); *B62D 21/11* (2013.01); *B62D 25/145* (2013.01); *B62D 31/003* (2013.01)

(58) Field of Classification Search
CPC .... B62D 25/081; B62D 21/11; B62D 25/145; B62D 31/003; B60S 1/0438
See application file for complete search history.

(56) References Cited

U.S. PATENT DOCUMENTS 5,868,426 A * 2/1999 Edwards .............. B62D 25/147
280/779
6,213,541 B1 * 4/2001 Razgunas ............ B62D 25/081
296/192

(Continued)

FOREIGN PATENT DOCUMENTS

EP           2548787 A1 * 1/2013 ........... B62D 25/081
JP        2010047076 A  * 3/2010
KR         101795403 B1   11/2017

*Primary Examiner* — Lori L Lyjak
(74) *Attorney, Agent, or Firm* — Mintz Levin Cohn Ferris Glovsky and Popeo, P.C.; Peter F. Corless (57) ABSTRACT

A front structure of a vehicle is provided and includes a first cowl panel that extends in a panel shape in a width direction of the vehicle, having a lower end coupled to an upper end of a dash panel, having an upper end bending toward a front of the vehicle and extending up to behind a lower end of a front windshield glass. A second cowl panel extends in an panel shape in the width direction of the vehicle, disposed under the first cowl panel, has an upper end that extends forward and is coupled to the lower end of the front windshield glass, has a lower end coupled to the first cowl panel, and forms a member that extends in the width direction of the vehicle behind the lower end of the front windshield glass together with the first cowl panel by being coupled to the upper end of the first cowl panel.

10 Claims, 8 Drawing Sheets

(51) Int. Cl.
*B60S 1/04* (2006.01)
*B62D 31/00* (2006.01)
*B62D 25/14* (2006.01)

(56) References Cited

U.S. PATENT DOCUMENTS 6,491,147 B1 * 12/2002 Kargilis ................ B60K 23/02
                                                            192/13 R
2018/0229671 A1 * 8/2018 Greggs ................ B62D 25/081

* cited by examiner

FRONT STRUCTURE OF VEHICLE BODY

CROSS-REFERENCE TO RELATED APPLICATION

This application claims the priority benefit of Korean Patent Application No. 10-2019-0042692, filed on Apr. 11, 2019, the disclosure of which is incorporated herein by reference.

BACKGROUND

1. Field of the Disclosure

The present disclosure relates to a front structure of a vehicle body, the front structure being able to secure collision strength, to be mounted without interference between chassis parts of a vehicle, and to improve strength of the vehicle body and a mount even if a front overhang is short in a micro mobility with a short front overhang of the vehicle.

2. Description of the Prior Art

Recently, the concept and type of vehicles as transportation have changed with development of autonomous vehicles and electric vehicles. Micro mobilities have been developed as a small transportation means in accordance with this demand of customers. Micro mobilities are electric vehicles without an engine and accordingly they are designed to reduce the overall size of the engine room to decrease unnecessary weight and increase fuel efficiency.

When an engine room is reduced in size, the front structures of a vehicle are shortened and the front overhang that is the distance between the front end of the vehicle and the center of the front axle is also reduced, and thus, the weight of the vehicle is decreased. However, when a front overhang is extremely shortened, as described above, the shock absorbing structure in a front collision is insufficient and the transmission time of impulse decreases, and thus, the shock that is transmitted to the interior increases. Accordingly, it is required to correspondingly change the front structure of a vehicle body to secure collision strength at the same level as the related art even if a design reducing an overhang is selected.

The description provided above as a related art of the present disclosure is merely for helping understanding the background of the present disclosure and should not be construed as being included in the related art known by those skilled in the art.

SUMMARY

The present disclosure provides a front structure of a vehicle body, the front structure being able to secure collision strength, to be mounted without interference between chassis parts of a vehicle, and to improve strength of the vehicle body and a mount even if a front overhang is short in a micro mobility with an extremely short front overhang of the vehicle.

In view of the above aspect, a front structure of a vehicle may include: a first cowl panel that extends in a panel shape in a width direction of the vehicle, having a lower end coupled to an upper end of a dash panel, having an upper end bending toward a front of the vehicle and that extends up to behind a lower end of a front windshield glass; and a second cowl panel that extends in an panel shape in the width direction of the vehicle, disposed under the first cowl panel, having an upper end extending forward and coupled to the lower end of the front windshield glass, having a lower end coupled to the first cowl panel, and forming a member that extends in the width direction of the vehicle behind the lower end of the front windshield glass together with the first cowl panel by being coupled to the upper end of the first cowl panel.

The upper end of the first cowl panel may be coupled to a center portion of the second cowl panel, and the first cowl panel and the second cowl panel may be spaced apart from each other between a center portion of the first cowl panel and the center portion of the second cowl panel, thereby forming the member. A blower aperture may be formed at a side of the first cowl panel through the first cowl panel under a joint with the second cowl panel, and may enable external air to flow into an air conditioning system of the vehicle.

The front structure may further include a front pillar inner panel having a panel shape with an upper portion that extends along the front windshield glass and a lower portion that extends along the dash panel, in which a first flange bending toward the front of the vehicle may be formed at both ends of the first cowl panel and a second flange bending toward the front of the vehicle may also be formed at both ends of the second cowl panel, and the front pillar inner panel may be coupled to side ends of the member formed by the first cowl panel and the second cowl panel through the first flanges and the second flanges.

The front pillar inner panel may have a ring-shaped panel shape and may extend along the edge of a door to close an open side end of the member formed by the first cowl panel and the second cowl panel. The front structure may further include a shock absorber mount disposed behind the lower end of the front windshield glass, in which the second cowl panel may be disposed over the shock absorber mount. The shock absorber mount may be disposed on both sides of the vehicle behind the lower end of the front windshield glass, and the shock absorber mounts at both sides may be connected by a cross member.

Additionally, a fender apron panel may be coupled to side ends of the shock absorber mount and the cross member, and a rear end of the fender apron panel may be coupled to the front pillar inner panel. A front portion of the second cowl panel may form an installation space by being recessed toward an interior, a window wiper motor may be disposed in the installation space, and the window wiper motor may be mounted on the second cowl panel. The window wiper motor may be directly mounted on the member formed by the first cowl panel and the second cowl panel.

According to the front structure of a vehicle body, it may be possible to secure collision strength, to be mounted without interference between chassis parts of a vehicle, and to improve strength of the vehicle body and a mount even if a front overhang is short in a micro mobility with an extremely short front overhang of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
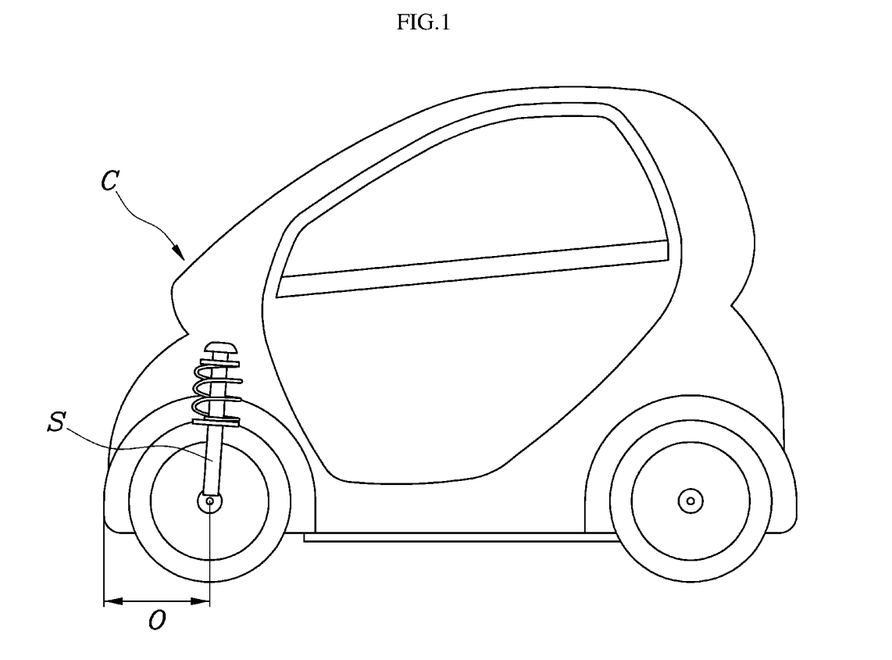
FIG. 1 is a view showing a vehicle equipped with a front structure for a vehicle body according to an exemplary embodiment of the present disclosure.
Figure 2:
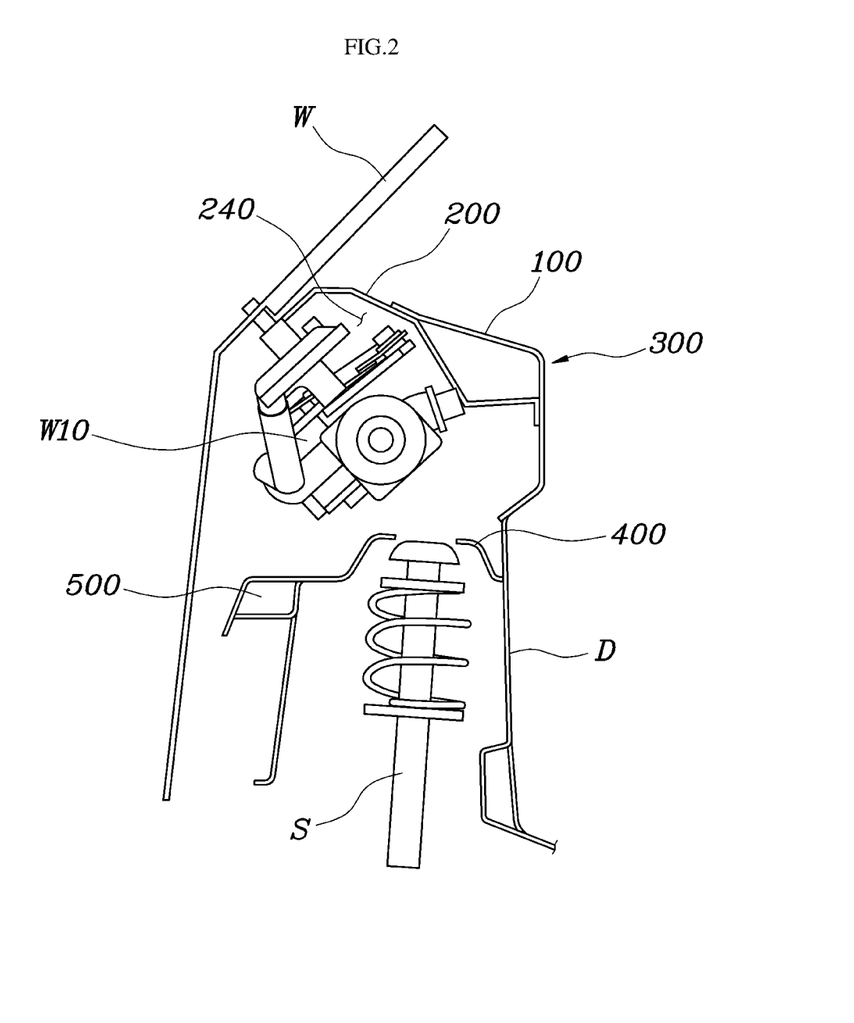
FIG. 2 is a cross-sectional view of the front structure of a vehicle body according to an exemplary embodiment of the present disclosure.
Figure 3:
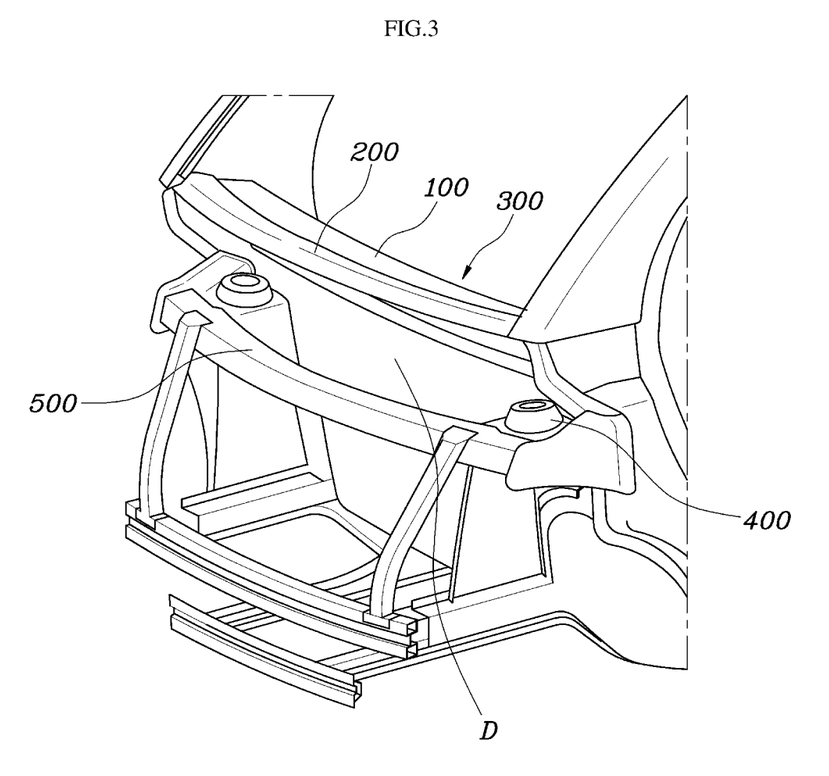
FIG. 3 is a perspective view of the front structure of a vehicle body according to an exemplary embodiment of the present disclosure.
Figure 4:
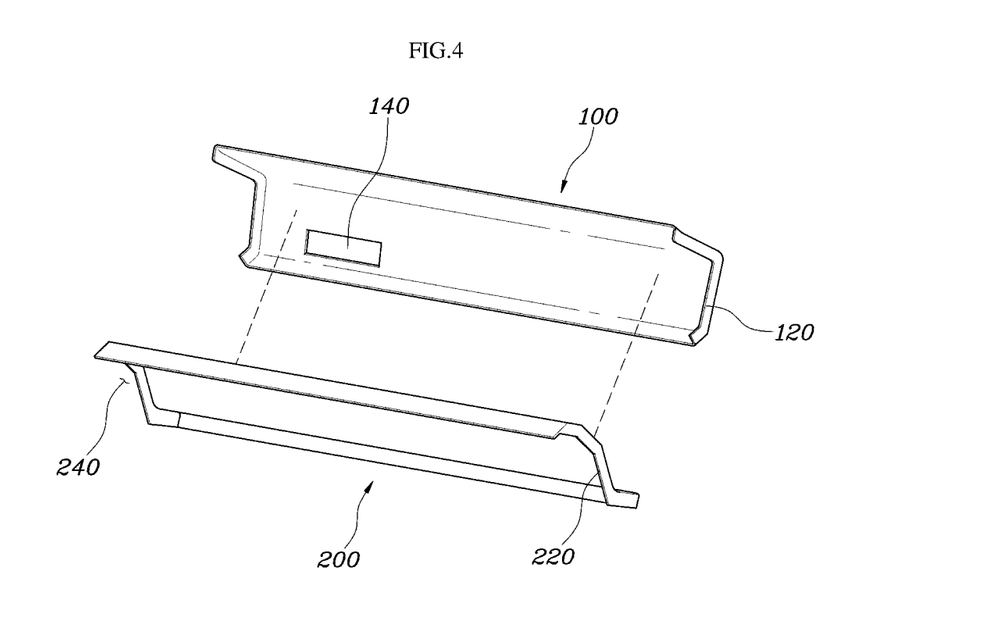
FIGS. 4 to 7 are views showing a process of assembling a front structure for a vehicle body according to an exemplary embodiment of the present disclosure.
Figure 5:
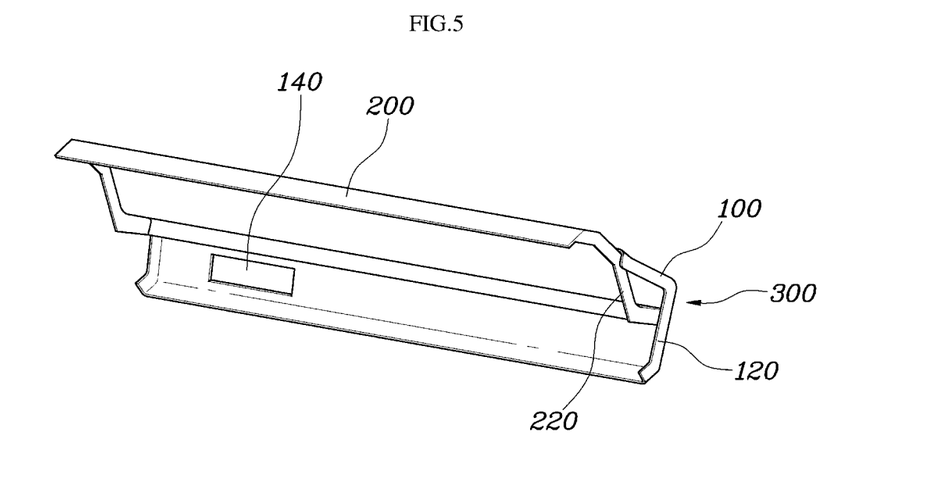
Figure 6:
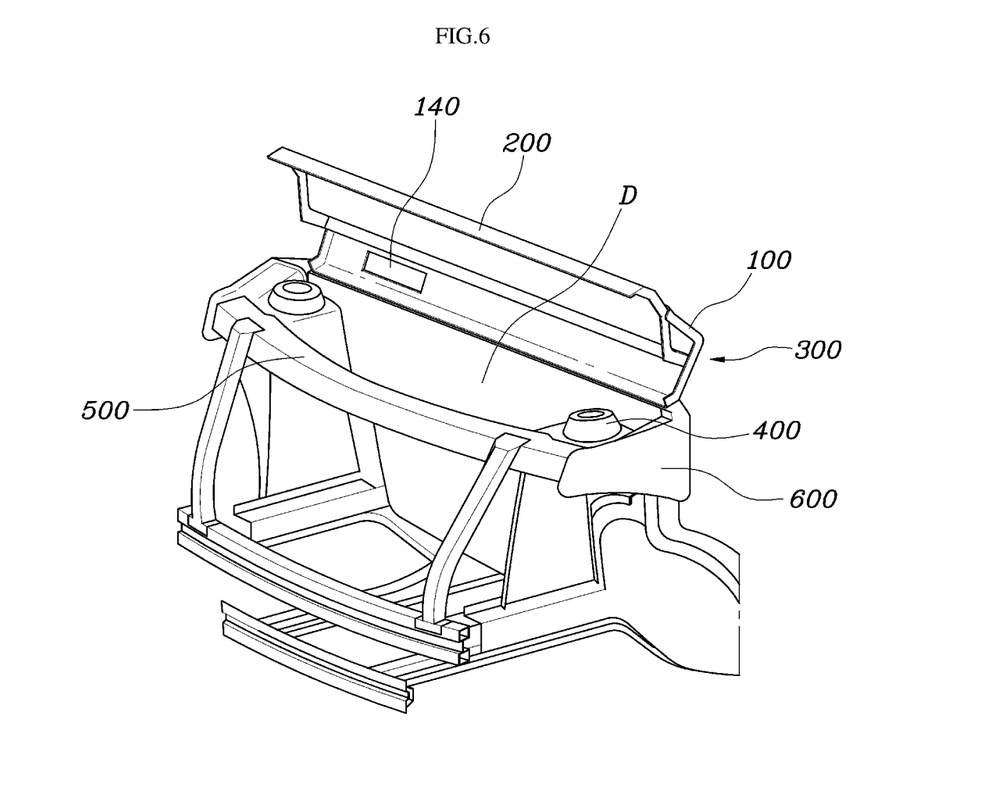
Figure 7:
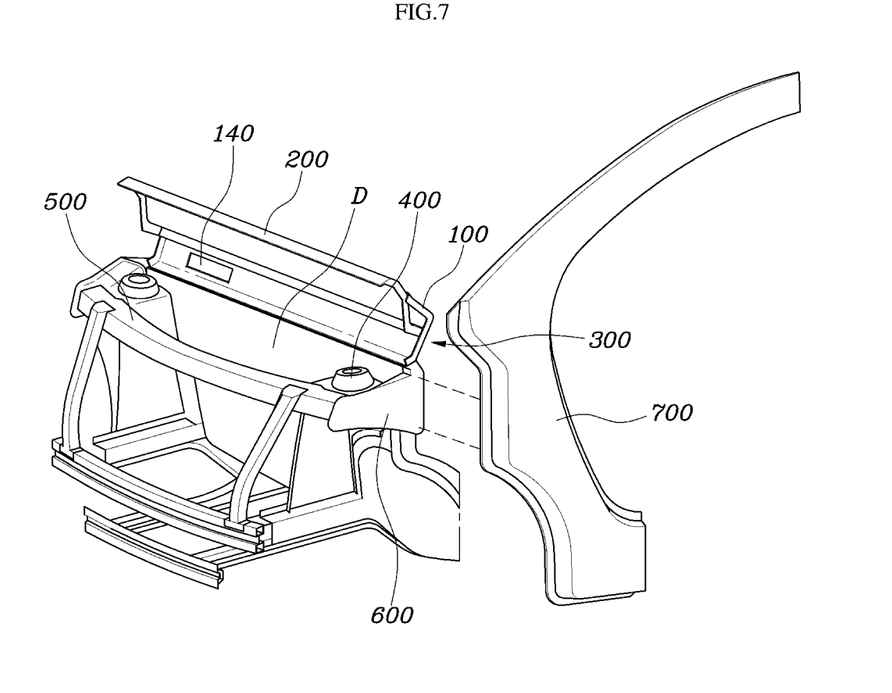
Figure 8:
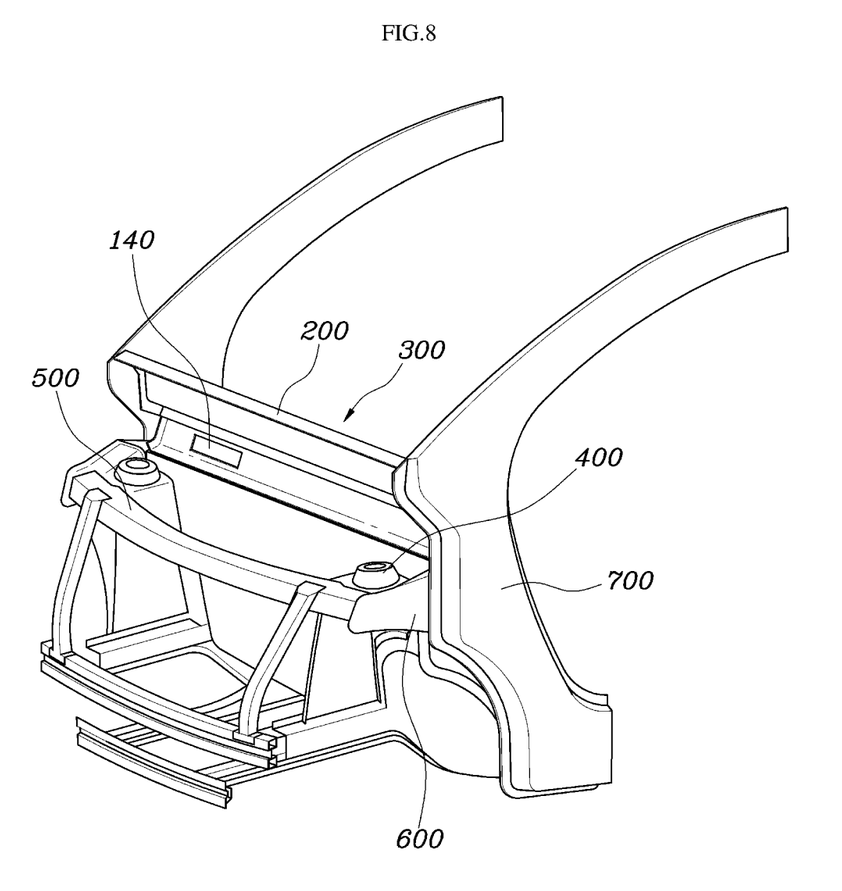
FIG. 8 is a view showing the state when a front structure for a vehicle body according to an exemplary embodiment of the present disclosure has been assembled.

FIG. 1 is a view showing a vehicle equipped with a front structure for a vehicle body according to an exemplary embodiment of the present disclosure, FIG. 2 is a cross-sectional view of the front structure of a vehicle body according to an exemplary embodiment of the present disclosure, FIG. 3 is a perspective view of the front structure of a vehicle body according to an exemplary embodiment of the present disclosure, FIGS. 4 to 7 are views showing a process of assembling a front structure for a vehicle body according to an exemplary embodiment of the present disclosure, and FIG. 8 is a view showing the state when a front structure for a vehicle body according to an exemplary embodiment of the present disclosure has been assembled.

FIG. 1 is a view showing a vehicle equipped with a front structure for a vehicle body according to an exemplary embodiment of the present disclosure. As shown in the figure, a vehicle that has a substantial effect when the present disclosure is applied is a vehicle with an extremely short front overhang O (e.g. 300-350 mm or less). Such a vehicle is an electric vehicle without an engine, it does not need an engine room. In this case, since there is no engine room, front side members or fenders are also very short, so, generally, load is supported insufficiently and a load pass is not formed in a front collision.

The present disclosure has been made to enable even a vehicle with a short overhang to resist a collision load and form a sufficient load pass by changing the front structure. In the vehicle shown in the figure, the front windshield glass may extend up to the forefront of the vehicle and the overhang is short. Accordingly, a shock absorber S mounting that supports the front wheel is unavoidably positioned behind the lowermost end of the front windshield glass in the vehicle. Accordingly, there is no cowl in the related art, so it unavoidably corresponds to a case without a cowl.

In order to achieve this structure, a front structure C of a vehicle according to the present disclosure may include: a first cowl panel 100 that extends in a panel shape in the width direction of the vehicle, having a lower end coupled to the upper end of a dash panel D, having an upper end bending toward the front of the vehicle and extending up to behind the lower end of a front windshield glass W; and a second cowl panel 200 that extends in an panel shape in the width direction of the vehicle, disposed under the first cowl panel 100, having an upper end extending forward and coupled to the lower end of the front windshield glass W, having a lower end coupled to the first cowl panel 100, and forming a member 300 that extends in the width direction of the vehicle behind the lower end of the front windshield glass W together with the first cowl panel 100 by being coupled to the upper end of the first cowl panel 100.

In order to achieve this structure, a front structure of a vehicle according to the present disclosure may include: a first cowl panel 100 that extends in a panel shape in the width direction of the vehicle, having a lower end coupled to the upper end of a dash panel D, having an upper end bending toward the front of the vehicle and extending up to behind the lower end of a front windshield glass W; and a second cowl panel 200 that extends in an panel shape in the width direction of the vehicle, disposed under the first cowl panel 100, having an upper end extending forward and coupled to the lower end of the front windshield glass W, having a lower end coupled to the first cowl panel 100, and forming a member 300 that extends in the width direction of the vehicle behind the lower end of the front windshield glass W together with the first cowl panel 100 by being coupled to the upper end of the first cowl panel 100.

FIG. 2 is a cross-sectional view of the front structure of a vehicle body according to an exemplary embodiment of the present disclosure, FIG. 3 is a perspective view of the front structure of a vehicle body according to an exemplary embodiment of the present disclosure, FIGS. 4 to 7 are views showing a process of assembling a front structure for a vehicle body according to an exemplary embodiment of the present disclosure, and FIG. 8 shows an assembled state.

As shown in the figures, a cowl of the present disclosure is not a structure that fills the space between a shock absorber mount 400 and the lower end of the front windshield glass W. Instead, the cowl has a structure that functions similar to a cowl rather behind the lower end of the front windshield glass W. Such a cowl-like structure is achieved by a combination of the first cowl panel 100 and a second cowl panel 200.

In particular, the first cowl panel 100 may have a panel shape that extends in the width direction of the vehicle and may have a lower end coupled to the upper end of the dash panel D. Further, the upper end may bend toward the front of the vehicle up to behind the lower end of the front windshield glass W. In other words, the cowl of the present disclosure may be disposed between the lower end of the front windshield glass W and the dash panel D. Further, the second cowl 200 may have a pane shape that extends in the width direction of the vehicle and may be disposed under the first cowl panel 100. The upper end may extend forward and be coupled to the lower end of the front windshield glass W. The lower end may be coupled to the first cowl panel 100. Accordingly, the upper end of the first cowl 100 may be coupled to the second cowl 200, and thus, the second cowl panel 200 may form the member 300 that extends in the width direction of the vehicle together with the first cowl 100 behind the lower end of the front windshield glass W.

The cowl-like structure of the present disclosure may be formed by combining the first cowl panel 100 and the second cowl panel 200 and the two panels form the member 300 having a close cross-section, thereby supplementing an insufficient front collision structure. Further, since the member 300 is formed, assembly strength may be efficiently secured even though the windshield glass W or a wiper motor M is mounted. Particularly, the upper end of the first cowl panel 100 may be coupled to the center portion of the second cowl panel 200, and the first cowl panel 100 and the second cowl panel 200 may be spaced apart from each other between the center portion of the first cowl panel 100 and the center portion of the second cowl panel 200, thereby forming the member 300.

A blower aperture 140 may be formed at a side of the first cowl panel 100 through the first cowl panel 100 under the joint with the second cowl panel 200, and enables external air to flow into an air conditioning system of the vehicle. In other words, although there is no cowl of the related art, the blower aperture 140 may be formed at the first cowl panel 100 instead, and thus, external air may flow into the interior of the vehicle.

Further, a front pillar inner panel 700 may be disposed on a side of the member 300. The front pillar inner panel 700 may have a panel shape with an upper portion that extends along the front windshield glass W and a lower portion that extends along the dash panel D. A first flange that bends toward the front of the vehicle may be formed at both ends of the first cowl panel 100 and a second flange 220 that bends toward the front of the vehicle may also be formed at both ends of the second cowl panel 200. The front pillar inner panel 700 may be coupled to side ends of the member 300 formed by the first cowl panel 100 and the second cowl panel 200 through the first flanges 120 and the second flanges 220, thereby forming a load pass in a collision.

Additionally, the front pillar inner panel 700 may have a ring-shaped panel shape and may extend along the edge of a door. The front pillar inner panel 700 is shown with the rear end cut in FIG. 7, but the front pillar inner panel 700 extends further rearward than that shown in the figure and may have a ring-shaped structure, thereby forming the edge of a door. The front end of the front pillar inner panel 700 may be coupled to the outer side of a fender apron panel 600 to close an open side end of the member 300 formed by the first cowl panel 100 and the second cowl panel 200.

This structure may be connected to the member 300 formed by the first cowl panel 100 and the second cowl panel 200, thereby forming a reciprocal load pass. Members should be in surface contact with each to each other to secure continuity of a load pass, and thus, the front pillar inner panel 700 may be coupled to side ends of the member 300 formed by the first cowl panel 100 and the second cowl panel 200 through the first flanges 120 and the second flanges 220. FIG. 8 shows the state when the fender apron panel 600 and the front pillar inner panel 700 are assembled.

The shock absorber mount 400 may be disposed behind the rear end of the front windshield glass W. Since the overhang is short, unlike common vehicles, the shock absorber mount 400 may be positioned behind the rear end of the front windshield glass W The second cowl panel 200 may be disposed over the shock absorber mount 400. The shock absorber mount 400 may be disposed on both sides of the vehicle behind the lower end of the front windshield glass W, and the shock absorber mounts 400 at both sides may be connected by a cross member 500. The cross member 500 may also be connected to the fender apron panel 600, as shown in the figure. Accordingly, a load pass through which a collision load transmitted to the cross member 500 substantially disposed at the forefront may be distributed and propagated to the cowl-side member 300 of the present disclosure through the shock absorber mount 400, the fender apron panel 600, and the front pillar inner panel 700.

Further, the cross member 500 may be connected perpendicularly to back beam member disposed thereunder, and thus, a collision load may be distributed through various paths. Accordingly, even if an overhang is short, the front structure may maximally absorb shock and transmit minimum shock to the interior, thereby reducing the peak of the maximum impulse applied to seats within the vehicle. Further, the front portion of the second cowl panel 200 may be recessed toward the interior, thereby forming an installation space 240. A window wiper motor W10 may be disposed in the installation space 240 and may be mounted on the second cowl panel 200.

Accordingly, as shown in the figure, the window wiper motor W10 may be directly mounted on the member 300 formed by the first cowl panel 100 and the second cowl panel 200. A separate bracket was disposed on a cowl to support the window wiper motor W10 in the related art, but in the present disclosure, strength may be secured by the closed cross-sectional structure of the member 300 formed by the first cowl panel 100 and the second cowl panel 200. Accordingly, the window wiper motor W10 may be mounted securely or firmly.

According to the front structure of a vehicle body, it may be possible to secure collision strength, to be mounted without interference between chassis parts of a vehicle, and to improve strength of the vehicle body and a mount even if a front overhang is short in a micro mobility with an extremely short front overhang of the vehicle.

Although the present disclosure was provided above in relation to specific exemplary embodiments shown in the drawings, it is apparent to those skilled in the art that the present disclosure may be changed and modified in various ways without departing from the scope of the present disclosure, which is described in the following claims.

What is claimed is:

1. A front structure of a vehicle, comprising:
  a first cowl panel that extends in a panel shape in a width direction of the vehicle, having a lower end coupled to an upper end of a dash panel, having an upper end bending toward a front of the vehicle and that extends up to behind a lower end of a front windshield glass; and
  a second cowl panel that extends in an panel shape in the width direction of the vehicle, disposed under the first cowl panel, having an upper end extending forward and coupled to the lower end of the front windshield glass, having a lower end coupled to the first cowl panel, and forming a member that extends in the width direction of the vehicle behind the lower end of the front windshield glass together with the first cowl panel by being coupled to the upper end of the first cowl panel.

2. The front structure of claim 1, wherein the upper end of the first cowl panel is coupled to a center portion of the second cowl panel, and the first cowl panel and the second cowl panel are spaced apart from each other between a center portion of the first cowl panel and the center portion of the second cowl panel to form the member.

3. The front structure of claim 1, wherein a blower aperture is formed at a side of the first cowl panel through the first cowl panel under a joint with the second cowl panel, and enables external air to flow into an air conditioning system of the vehicle.

4. The front structure of claim 1, further comprising:
a front pillar inner panel having a panel shape with an upper portion that extends along the front windshield glass and a lower portion that extends along the dash panel,
wherein a first flange that bends toward the front of the vehicle is formed at both ends of the first cowl panel and a second flange that bends toward the front of the vehicle is formed at both ends of the second cowl panel, and
wherein the front pillar inner panel is coupled to side ends of the member formed by the first cowl panel and the second cowl panel through the first flanges and the second flanges.

5. The front structure of claim 4, wherein the front pillar inner panel has a ring-shaped panel shape and extends along the edge of a door to close an open side end of the member formed by the first cowl panel and the second cowl panel.

6. The front structure of claim 1, further comprising:
a shock absorber mount disposed behind the lower end of the front windshield glass,
wherein the second cowl panel is disposed over the shock absorber mount.

7. The front structure of claim 6, wherein the shock absorber mount is disposed on both sides of the vehicle behind the lower end of the front windshield glass, and the shock absorber mounts at both sides are connected by a cross member.

8. The front structure of claim 7, wherein a fender apron panel is coupled to side ends of the shock absorber mount and the cross member, and a rear end of the fender apron panel is coupled to the front pillar inner panel.

9. The front structure of claim 1, wherein a front portion of the second cowl panel forms an installation space by being recessed toward an interior, a window wiper motor is disposed in the installation space, and the window wiper motor is mounted on the second cowl panel.

10. The front structure of claim 9, wherein the window wiper motor is directly mounted on the member formed by the first cowl panel and the second cowl panel.

* * * * *